United States Patent [19]
Hecht

[11] Patent Number: 5,494,442
[45] Date of Patent: Feb. 27, 1996

[54] BREAST EXAMINATION RECORDING SYSTEM

[76] Inventor: Marlene K. Hecht, 8645 N. Dean Cir., River Hills, Wis. 53209

[21] Appl. No.: 330,046

[22] Filed: Oct. 27, 1994

[51] Int. Cl.$^6$ ..................................................... B43L 1/00
[52] U.S. Cl. .......................... 434/267; 434/269; 434/416
[58] Field of Search ..................................... 434/408, 410, 434/413, 414, 415, 416, 421, 428, 430, 269, 262, 365, 273, 267; 40/107, 110, 219, 119

[56] References Cited

U.S. PATENT DOCUMENTS

| | | | |
|---|---|---|---|
| 396,381 | 1/1889 | Yaggy . | |
| 2,297,066 | 9/1942 | Miller | 41/4 |
| 3,030,922 | 4/1962 | Rosenthal | 120/1 |
| 3,083,427 | 4/1963 | Grenon | 24/84 |
| 3,517,636 | 6/1970 | Colon-Morales | 116/67 |
| 3,951,062 | 4/1976 | Abramson | 101/426 |
| 5,110,295 | 5/1992 | Concra | 434/416 |
| 5,207,582 | 5/1993 | Michelson | 434/416 |
| 5,431,450 | 7/1995 | Coelman | 434/416 |

*Primary Examiner*—John S. Hilten
*Attorney, Agent, or Firm*—Quarles & Brady

[57] ABSTRACT

Information derived from breast self-examination is recorded using a system that includes a plurality of transparent overlays. Each overlay has a plurality of images depicting front and side views of right and left female breasts, with each image having a coordinate system. A writing board has a surface with a number of pegs extending therefrom. When an overlay is placed against the writing board surface the pegs extend through holes in the overlay. The pegs and holes provide a mechanism that registers the images on multiple overlays applied against the surface. An overlay is used to record information about the position and size of masses detected in a breast. Each overlay represents the condition of the breast at a different point in time.

18 Claims, 3 Drawing Sheets

BREAST EXAMINATION RECORDING SYSTEM

BACKGROUND OF THE INVENTION

The present invention relates to human breast examination techniques, such as those used to detect lumps and masses; and more particularly to devices for recording the results of such examination.

The high frequency of breast cancer of women has made it imperative that women periodically conduct self-examination of their breasts in order to detect masses, commonly referred to as lumps. Different self examination techniques are well known and literature is readily available to instruct women on the techniques. The self-examination can be conveniently performed while taking shower. Typically, self breast examination is performed monthly, two or three days after the menstrual cycle, or on the same day of the month for post-menopausal women.

Frequently, when a woman detects an unusual mass in her breast and consults a physician, the mass is found to be a fibrous mass (or cyst) which formed as a result of overreaction to the normal hormones produced during ovulation. Fibrocystic changes are the most common benign breast condition. However, these masses must be monitored as dramatic changes in size, shape or position indicate the need for professional examination. Thus continued monthly self-examination is required to monitor the fibrocystic mass.

It is often difficult for a woman to remember from month to month the exact size and precise location of the mass. This problem can contribute to unwarranted concern by the woman who may believe that a change has occurred when in fact the mass has remained the same. The solution is to record information derived from the self-examination. However, non-medically trained women may find it difficult to describe accurately the location, size and characteristics of the mass.

SUMMARY OF THE INVENTION

A general object of the present invention is to provide a system for recording the results of a breast examination.

Another object is to provide such a recording system to supplement examinations by a physician and mammography as recommended by the American Breast Cancer Association.

A further object of the present invention is to provide such a recording system that can be utilized by non-medically trained women to record the results of breast self-examination.

Yet another object is to provide a recording system that can be placed within a shower enclosure to record results of a breast self-examination that is conducted during showering.

These objects are satisfied by a breast examination recording system that includes a plurality of transparent overlays. Every overlay has a plurality of images depicting the left and right female breast from the front and side. Preferably each image depicts the breast in a coordinate system. The system also includes a writing board with a surface and a registration mechanism for attaching the plurality of overlays to the surface wherein images on one overlay are registered with images on another overlay. For example the registration mechanism includes pegs extending from the surface of the writing board and passing through holes in the overlays. An instrument is provided for writing information on the plurality of overlays, preferably in different colors.

Upon detecting a mass in a breast, the woman records information regarding a location and size of the mass on the corresponding images of a first overlay which has been applied against the writing board surface. Preferably one color of markings are used to record this information.

Thereafter when a change in the condition of the breast is detected, information about the then present condition of the breast is recorded on a second overlay. The change may be with respect to a previous mass or the appearance of another mass. Preferably another color of markings are used to record this subsequent information. The second overlay is placed against the first overlay on the writing board and the registration mechanism aligns the images on the two overlays.

BRIEF DESCRIPTION OF THE DRAWINGS

FIG. 4 shows the an attachment mechanism used to secure the board to a surface and to register the recording sheets.

DETAILED DESCRIPTION OF THE INVENTION

Figure 1:
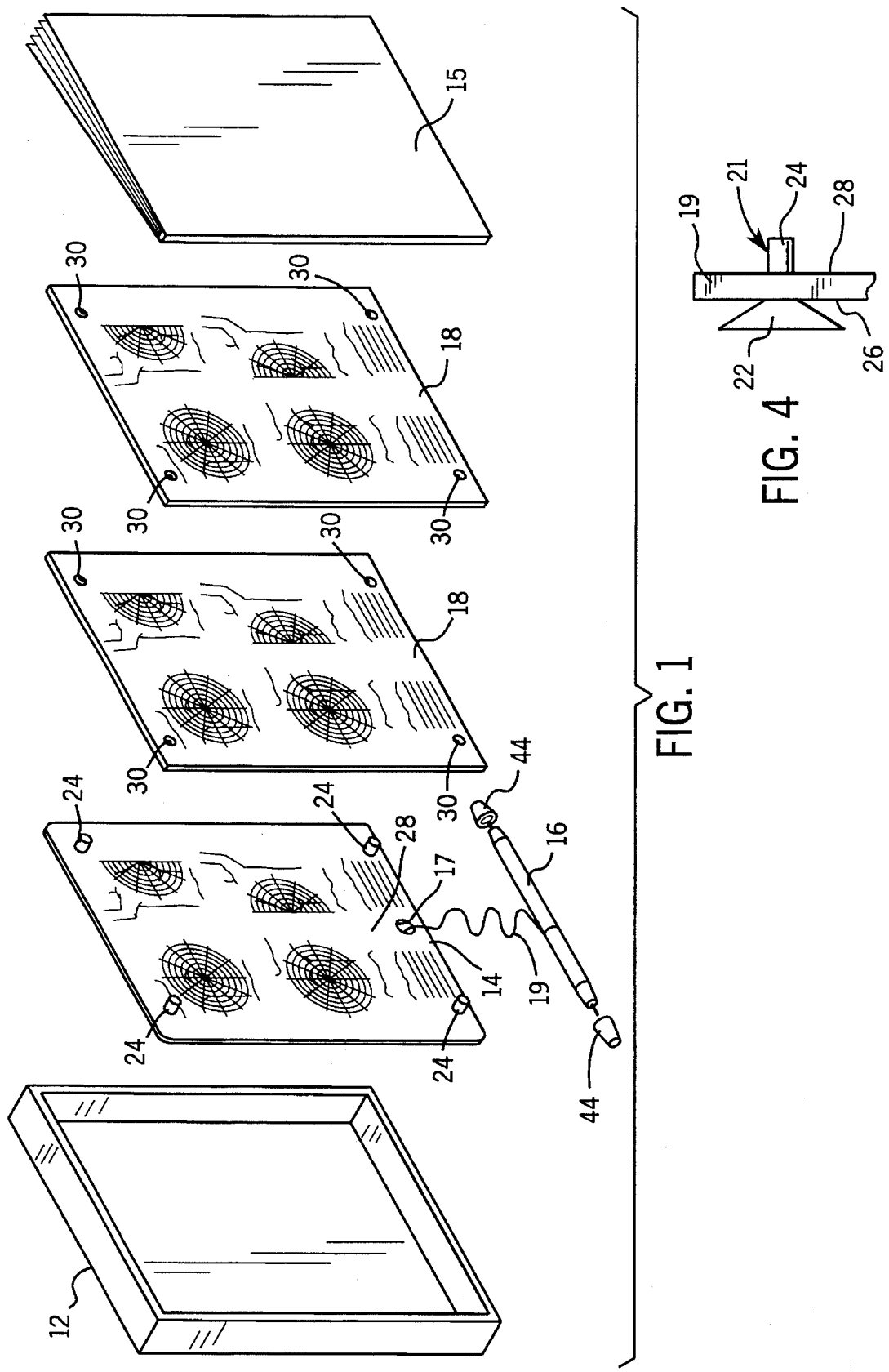
FIG. 1 is an exploded view showing the components of a breast examination recording system according to the present invention.

With reference to FIG. 1, a breast self-examination system according to the present invention is in the form of a kit 10 which comprises a box 12, a writing board 14, writing instrument 16 and a plurality of transparent overlays 18. An instruction booklet 15 is included in the box 12 and describes the procedure for breast self-examination and recording of the results using the present system.

Figure 2:
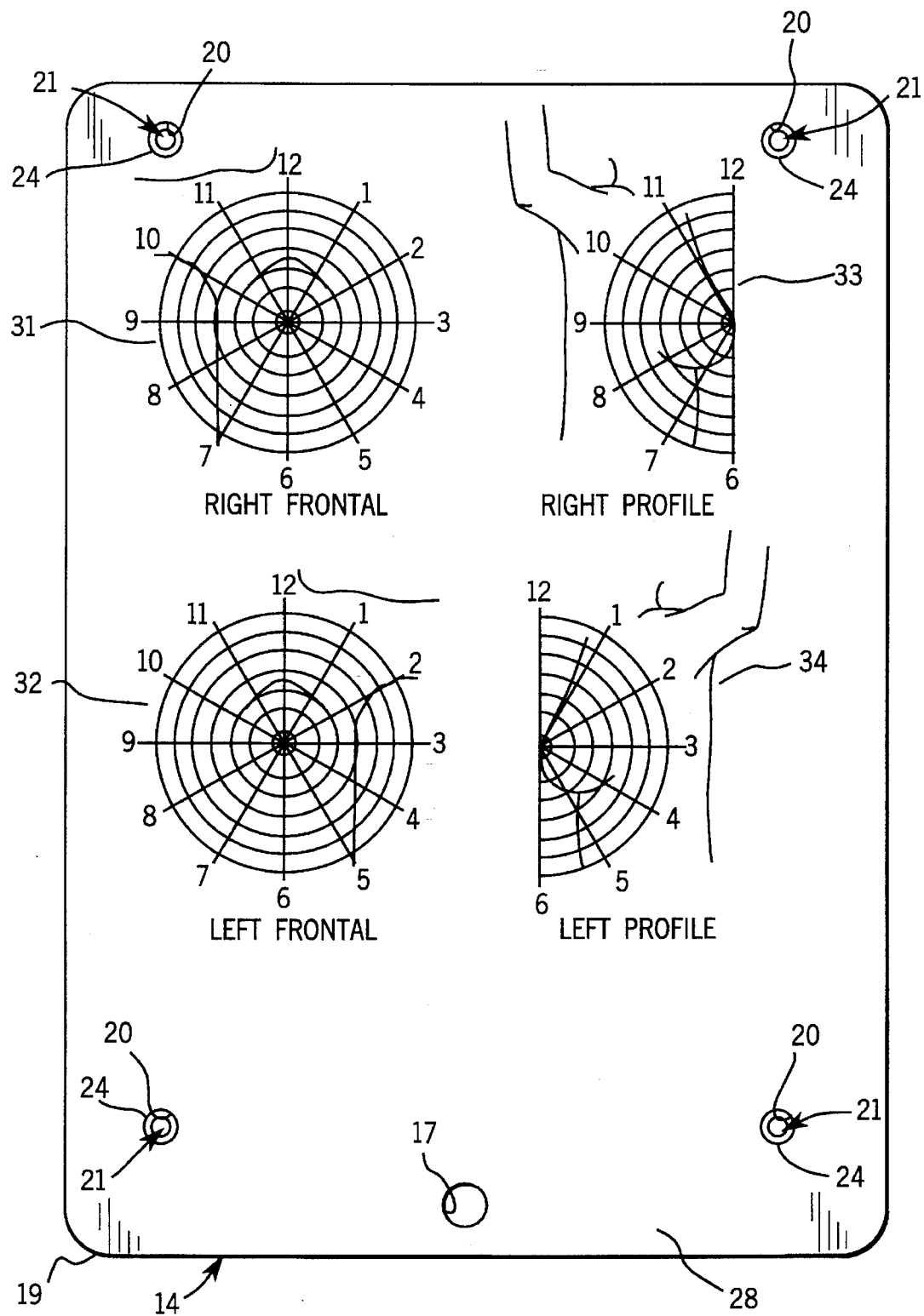
FIG. 2 is a plane view of the surface of a board used to hold sheets on which examination data are recorded.

The writing board 14, as shown in detail in FIG. 2, has a flat rectangular body 19 with four circular apertures 20 located in proximity to each of the corners. A separate attachment mechanism 21 extends through each aperture 20. As shown in FIG. 4, the attachment mechanism 21 is made of a resilient plastic material and includes a suction cup 22 from which projects a tubular peg 24. The peg 24 extends through one of the apertures 20 in body 19 and securely engages the walls of the aperture 20 to hold the attachment mechanism 21 in place with the suction cup 22 on the rear surface 26 of the body 19. The four suction cups 22 enable the writing board 14 during use to be attached to a wall of a shower enclosure. For example, the suction cups 22 are applied to the tiles or the fiberglass shell of the enclosure to mount recording system in a convenient location for the user to enter and refer to the results of the examination.

The pegs 24 of the attachment mechanisms 21 project outward from the front surface 28 of the body 19 as shown in FIG. 1. The projecting peg portions support the overlays 18 on the writing board 14. Specifically, each overlay 18 is formed of a transparent sheet with four apertures 30 spaced to correspond to the spacing of the pegs 24 projecting from the writing board 14. The spacing and size of the apertures 30 enables the overlay 18 to be placed against the front surface 28 with pegs 24 extending through the apertures 30, thus securely holding the overlay against that front surface.

As shown in FIG. 2, the front surface 28 of the writing board 14 has four graphs 31, 32, 33 and 34 depicting images of the human female chest from different angles. Graph 34 shows a front view of the right female breast with a polar coordinate system centered at the breast nipple. Graph 32 illustrates a front view image of the left breast with a polar coordinate system centered at the nipple. The polar coordinate system has twelve radial lines providing a clock face like reference system that is easily understood by the user. Graph 33 is a right profile image of a female torso with a semi-circular polar coordinate system centered at the breast nipple and extending inward to the torso. The final graph 34 is a left profile image of the human female torso with a semi-circular polar coordinate system centered at the breast nipple. The semi-circular polar coordinate system has seven radial lines providing a reference system that corresponds to half a clock face. Although information about the location and size of a mass within the breast can be recorded on the front surface 28 of the writing board 14, it is preferred that such annotations not be made on that surface, but rather on overlays 18 applied against the surface as will be described. As a result, the front surface 28 of the writing board 18 may be left blank.

Figure 3:
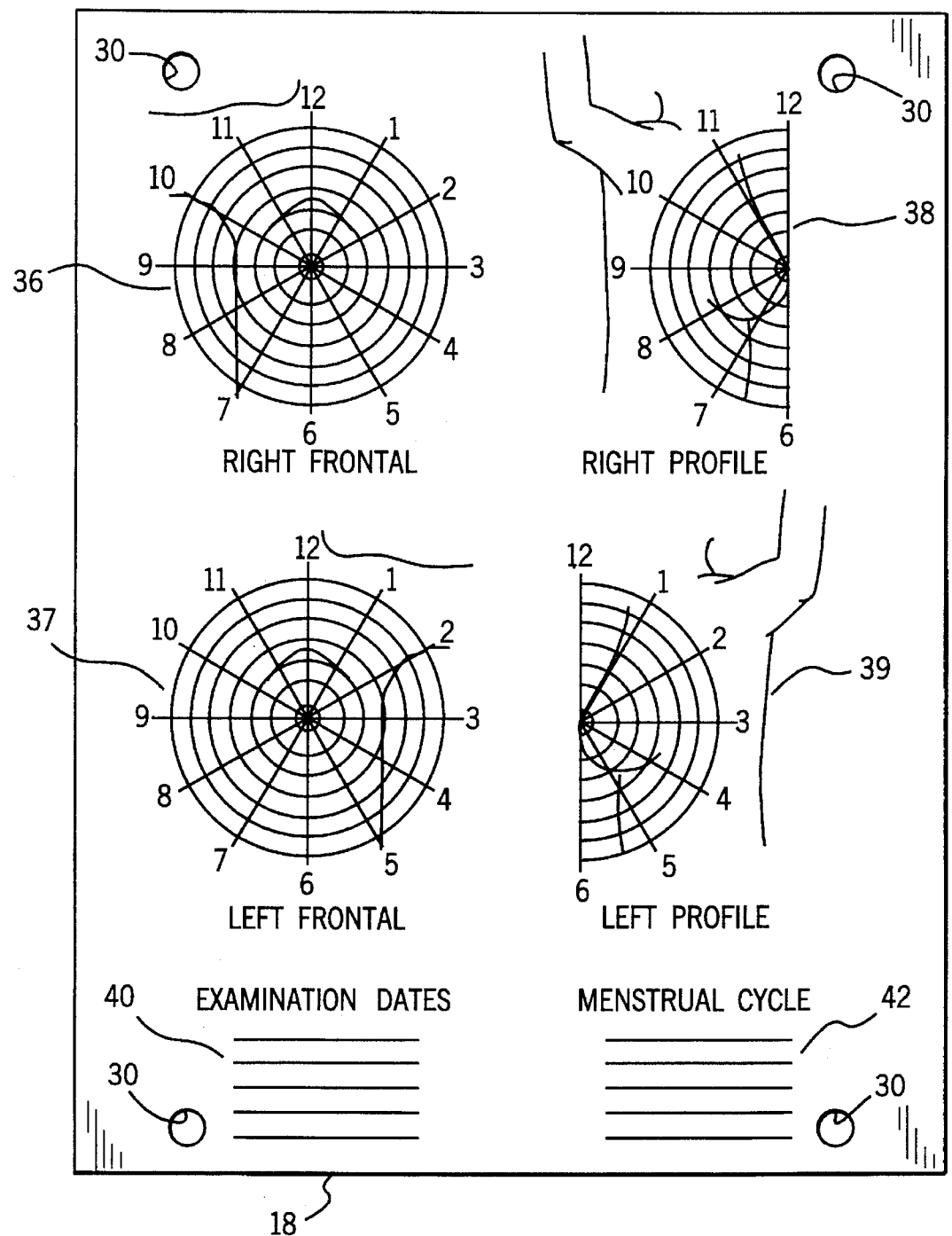
FIG. 3 illustrates one of the recording sheets.

Each kit 10 typically contains four overlays 18, with only two of the overlays being shown in FIG. 1. All of the overlays are identical and can be placed one over the other on the pegs 24 projecting from the writing board 14. Extra overlays 18 can be stored in box 12 until needed. Referring to FIG. 3, the overlays 18 are transparent sheets printed with four graphs 36, 37, 38 and 39 which are identical to the four graphs 31, 32, 33 and 34, respectively on the writing board 14. The graphs 36-39 on the overlay 18 are accurately positioned with respect to the apertures 30 in the overlay. This positioning results in the graphs 36-39 on the overlay being registered with the corresponding graphs 31-38 on the writing board 14 when the overlay is placed onto the pegs 24 and against surface 28. At the bottom of the overlay 18 is a section 40 for recording the dates on which each breast examination is conducted. Another section 42 at the bottom of the overlay 18 provides a space for recording the date of the woman's last menstrual cycle.

Referring again to FIG. 1, an aperture 17 is located along the bottom portion of the body 19 of the writing board 14 with a cord 19 attached at one end through the aperture 17. For example, the one end of cord 19 may have a T-shape which can be bent to pass through the aperture 17 and thereafter returns to shape preventing extraction of the end back through the aperture. The other end of cord 19 is attached to the writing instrument 16 which is an indelible marker of the type used by underwater divers to write with while submerged, for example. This type of marker contains non-water soluble marking material, such as ink, thereby enabling the results of the breast examination to be recorded on the overlays 18 in a shower. Each end of the writing instrument 16 has a different colored marker with separate end caps 44 to seal those ends and prevent the ink from drying out. The use of different colors enables the results of one month's examination to be distinguished from the results of another month's examination, as will be described.

To use the recording system, a woman applies one of the overlays 18 to the front surface of the writing board 14 by pushing the pegs 24 through the holes 30 in the overlay. The writing board 14 is applied to a wall of the user's shower enclosure by pressing the suction cups against that wall. The woman then examines each breast and lymph region, and records the location and size of any masses on the graphs 36-39 of the overlay 18 using one of the ink colors. For example, if a mass if found in her right breast, the position and approximate size of the mass is recorded in the right frontal graph 36 and the right profile graph 38 providing a three-dimensional indication of the mass location. The size of the mark made on the graphs with writing instrument 16 indicates of the size and shape of the mass. Other irregularities within the breast and lymph regions also can be recorded. The date of the examination and the date of her last menstrual cycle are recorded in sections 40 and 42 on the overlay.

Alternatively, a physician may record the position and size of masses detected during mammography or professional examination on the first overlay. This provides a bench mark for the woman to use in subsequent self-examination of her breasts.

Approximately one month later, the woman performs another self-examination of her breasts and lymph regions. If the presence, size and location of any previously detected masses has not changed, no marks need to be made on the graphs 36-37 of the overlay. However, the dates of the examination and menstrual cycle for the present month are recorded in sections 40 and 42. This monthly process continues until either a different mass is detected or a previously detected mass disappears or changes in the size, shape or position.

Upon detecting any of those latter occurrences, the woman places a second overlay 18 onto the writing board 14 over the first overlay. Because the graphs on each overlay are accurately positioned with respect to the apertures 30, the graphical images on each overlay are registered when positioned on the writing board pegs 24. The woman then uses the writing instrument 16 to mark the graphs 36-39 on the second overlay to indicate the position, size and shape of each mass now being detected. A different colored ink is used to mark each overlay thereby clearly indicating the changes that have occurred from one month to another. Additional overlays are placed on the writing board to record changes found during subsequent breast self-examinations.

At any time, the woman is able to remove the overlays 18 from the writing board 14 and take them to her physician to provide accurate information as to changes that occurred and the dates of those occurrences.

I claim:

1. A system for recording information derived from a breast examination, said system comprising:

a plurality of transparent overlays, each overlay has a a first image of a front view of a right human female breast, a second image of a side view of a right human female breast, a third image of a front view of a left human female breast and a fourth image of a side view of a left human female breast; and a writing board having a surface and a registration mechanism for attaching the plurality of overlays to the surface wherein images on one overlay are registered with images on another overlay.

2. The system as recited in claim 1 wherein the registration mechanism of said writing board comprises a number of pegs projecting from the surface; and wherein each of said plurality of overlays has a like number of apertures positioned to receive the pegs when an overlay is applied against the surface of said writing board.

3. The system as recited in claim 1 wherein the first and third images depict the human female breast within a polar coordinate system, and the second and fourth images depict the human female breast in a semi-circular polar coordinate system.

4. The system as recited in claim 1 wherein each one of the first, second, third and fourth images on a overlay depicts a female breast within a coordinate system.

5. The system as recited in claim 1 wherein each of the plurality of overlays also includes a section demarcated for recording dates of breast examination.

6. The system as recited in claim 1 further comprises an instrument for writing information on said plurality of overlays in non-water soluble marking material.

7. The system as recited in claim 1 further comprises an instrument for writing information on said plurality of overlays in two different colors.

8. The system as recited in claim 1 wherein said writing board has a suction cup connected thereto for attaching the writing board to a support surface.

9. A system for recording information derived from a breast examination, said system comprising:

a sheet having thereon a first plurality of images depicting a human female breast;

a transparent overlay having thereon a second plurality of images depicting a human female breast;

wherein each one of said first plurality of images and said second plurality of images includes a first image of a front view of a right human female breast, a second image of a side view of a right human female breast, a third image of a front view of a left human female breast and a fourth image of a side view of a left human female breast; and a writing board having a surface and a registration mechanism for attaching said sheet and said overlay to the surface wherein images on the transparent overlay are registered with images on the sheet.

10. The system as recited in claim 9 wherein each one of the plurality of images on a overlay depicts a female breast within a coordinate system.

11. A kit for a woman to employ to record information derived from a breast self-examination, said kit comprising:

a writing board having a surface, a first member projecting from the surface and a second member projecting from the surface;

a plurality of transparent overlays for placement against the surface of the writing board, each overlay has a first image section depicting a frontal view of a female chest, a second image section depicting a left side view of a female chest, and third image section depicting a right side view of a female chest, and each overlay having a first aperture which engages the first member and a second aperture which engages the second member to thereby register overlays with one another when placed against the surface of the writing board; and an instrument for writing information on said plurality of overlays and having a device for attaching to said writing board.

12. The kit as recited in claim 11 wherein the first image section of each overlay comprises one image depicting a frontal view of a right breast and another image depicting a frontal view of a left breast.

13. The kit as recited in claim 11 wherein the first, second and third image sections on each overlay depicts a female breast within a polar coordinate system.

14. The kit as recited in claim 11 wherein said instrument for writing information has implements to produce marks in two different colors.

15. The kit as recited in claim 11 wherein said instrument for writing information has a non-water soluble marking material.

16. The kit as recited in claim 11 wherein said writing board has a suction cup connected thereto for attaching the writing board to a support surface.

17. A method for recording results from a breast examination, said method comprising steps of:

providing a sheet which has images depicting front and side views of a female breast;

providing at least one transparent overlay which has images depicting front and side views of a female breast;

upon detecting a mass in a breast, recording information regarding a location and size of the mass on the sheet;

thereafter upon detecting a change in the breast from the information recorded on the sheet, recording information regarding the change on the transparent overlay; and placing the overlay against the sheet with the images depicting front and side views of a female breast on the overlay registered with the images depicting front and side views of a female breast on the sheet.

18. The method as recited in claim 17 wherein markings of one color are used to record information on the sheet and markings of another color are used to record information on the overlay.

* * * * *